Aug. 27, 1968     P. T. JAHNKE     3,398,596

GAIN POWER TRANSMITTING DEVICE

Filed April 20, 1967     3 Sheets-Sheet 1

INVENTOR
PAUL T. JAHNKE
BY
Carl Miller
ATTORNEY

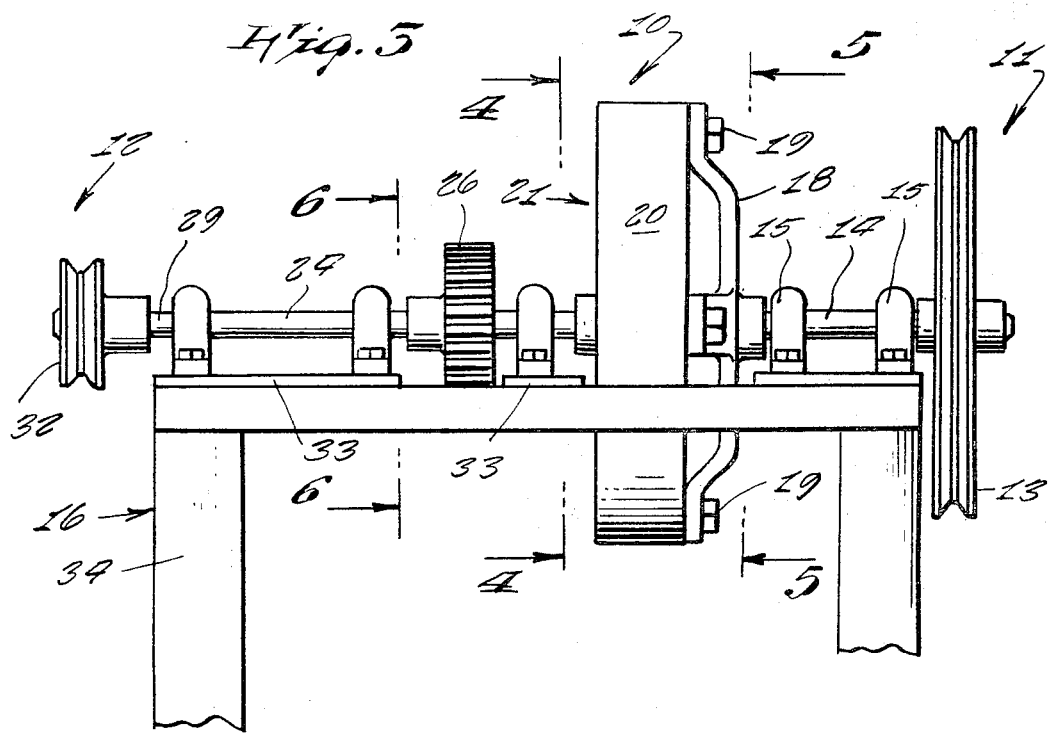
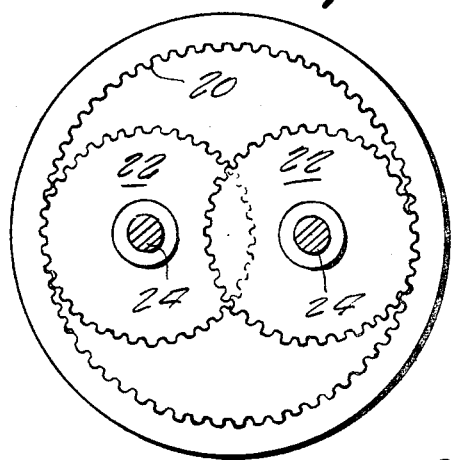
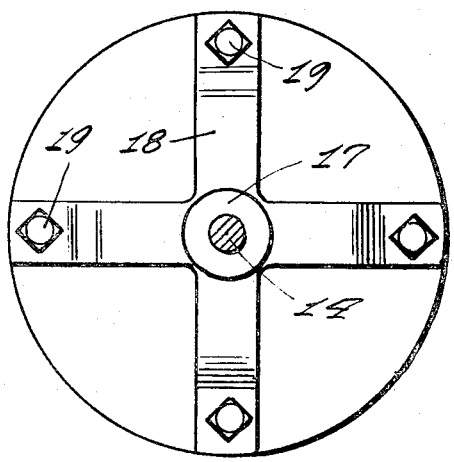
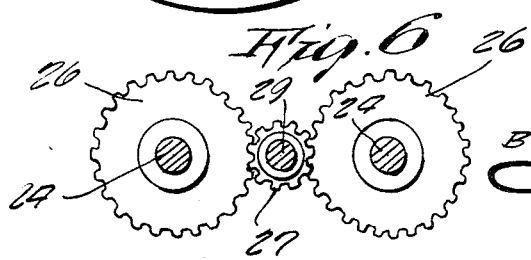

United States Patent Office 3,398,596
Patented Aug. 27, 1968

3,398,596
GAIN POWER TRANSMITTING DEVICE
Paul T. Jahnke, 155 W. 75th St., Apt. 2,
New York, N.Y. 10023
Filed Apr. 20, 1967, Ser. No. 632,304
8 Claims. (Cl. 74—413)

ABSTRACT OF THE DISCLOSURE

A transmission assembly for transmitting power, including a gear train that is driven by an input shaft from a power source, the gear train driving a simple gear system connected to an output shaft, and wherein the output shaft attains a speed change relative to the input shaft.

SPECIFICATION

This invention relates generally to mechanical transmissions. More specifically it relates to speed changing mechanisms.

A principal object of the present invention is to provide a transmitting device which will produce a change in speed between an input and an output end.

Another object is to provide a transmitting device which employs a gear train for transmitting power between an input and an output end.

Yet another object is to provide a transmitting device that is readily adaptable for use in a large number of various machines.

Yet another object is to provide a transmitting device wherein the transmitted power may be in the form of increased linear travel.

Yet a further object is to provide a transmitting device employing known mechanical elements and movements which in combination produce a new and useful result.

Other objects are to provide a power transmitting device which is simple in design, inexpensive to manufacture, rugged in construction, easy to use and efficient in operation.

Figure 1:
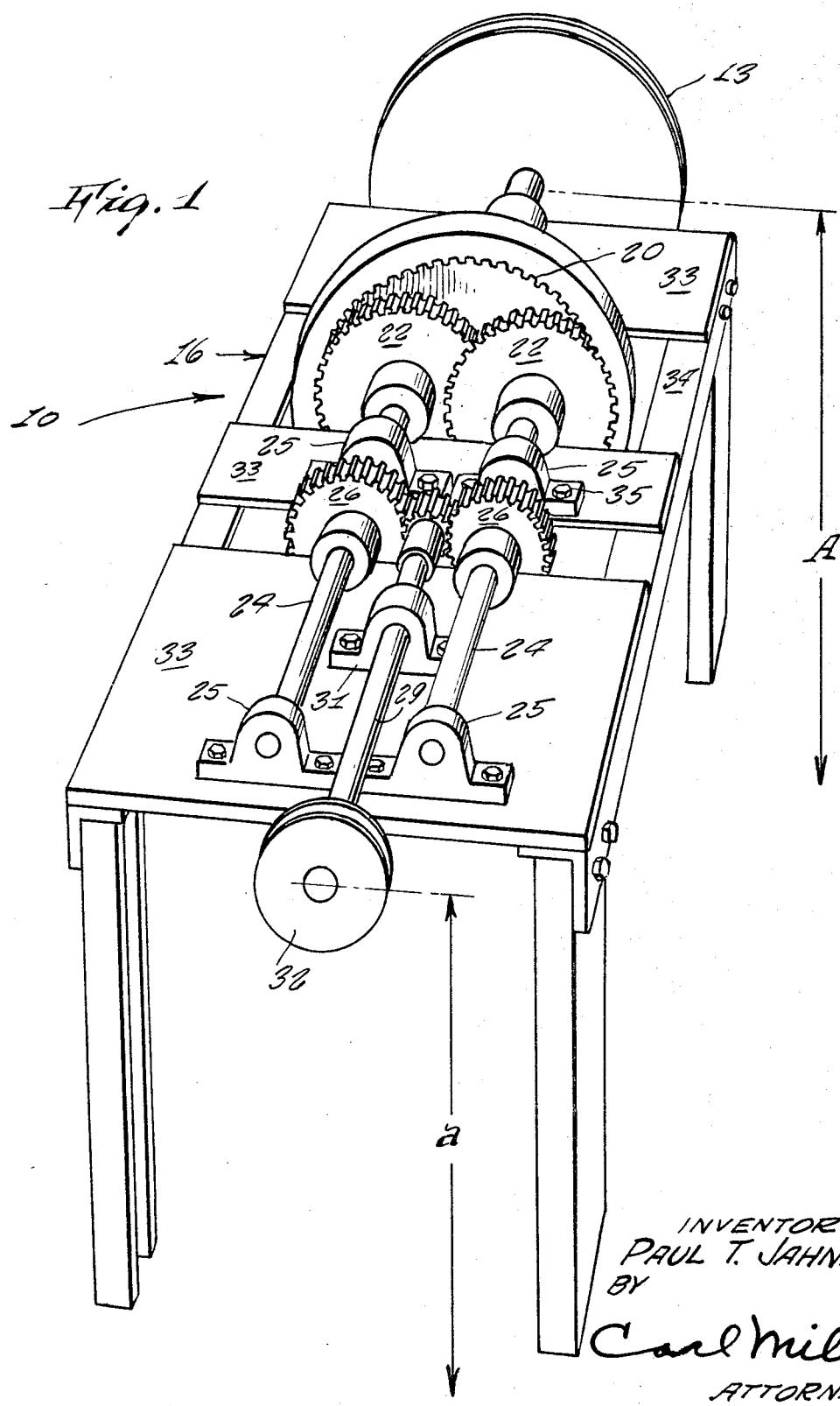
Figure 2:
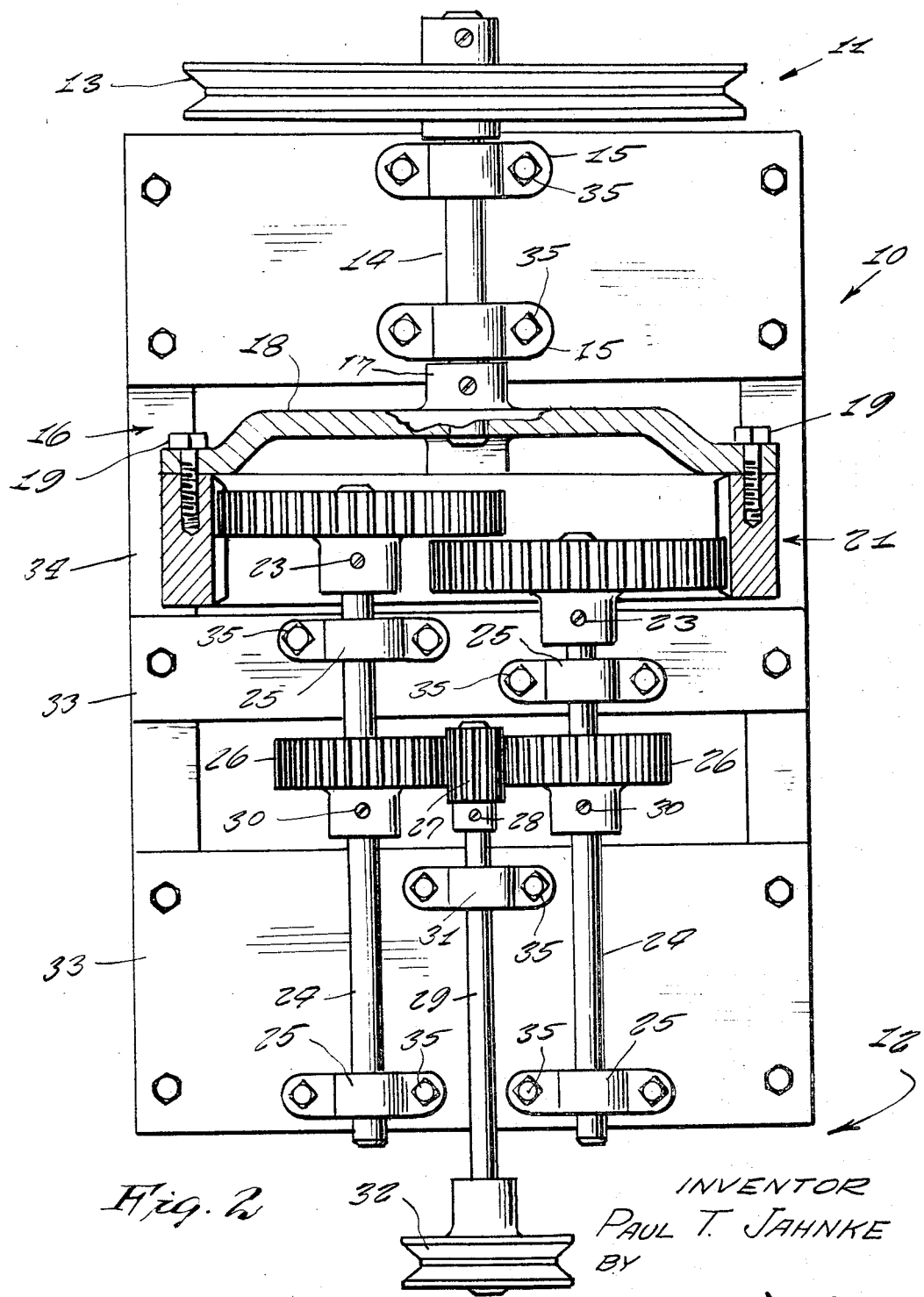

These and other objects will be readily evident upon a study of the following specification and the accompanying drawing wherein:

FIGURE 1 is a perspective view of the present invention shown supported upon a mounting frame, FIGURE 2 is a top plan view thereof shown partly in cross section to illustrate the internal construction thereof, FIGURE 3 is a side elevation view thereof, FIGURE 4 is a cross sectional view taken along line 4—4 of FIGURE 3, FIGURE 5 is a cross sectional view taken along line 5—5 of FIGURE 3, and FIGURE 6 is a cross sectional view taken along line 6—6 of FIGURE 3.

Referring now to the drawing in detail, the reference numberal 10 represents a power transmitting device according to the present invention wherein there is an input end 11 and an output end 12, the input end comprising a pulley 13 mounted on a shaft 14 supported within spaced apart bearing blocks 15 mounted upon a frame 16, the pulley being driven by a belt (not shown) from any form of power source.

The end of input shaft 14 is secured within a hub 17 of a spider 18 that is attached by means of bolts 19 to one side of an internal gear 20.

The internal gear comprises one member of a gear train 21 that includes a pair of gears 22 that are contained within the internal gear 20 and are in toothed engagement therewith. The gears 22 are of equal size, and each has a pitch circle diameter which is greater than the pitch circle radius of the internal gear 20. Accordingly the gears 22 necessarily overlap each other, as is evident in FIGURES 1 and 2; the internal gear 20 having a sufficiently great enough width to accommodate engagement with both gears 22 located side by side adjacent each other.

The gears 22 are secured firmly, by means of set screws 23 or the equivalent, to ends of a pair of shafts 24 supported rotatably free within bearing blocks 25 mounted on the frame 16.

Each shaft 24 carries additionally a second gear 26, the gears 26 being of equal dimension and specification to each other, the gears 26 being toothedly engaged with a common pinion 27 secured by means of set screw 28 upon an output shaft 29. The second gears 26 are rigidly affixed to shafts 24 by means of set screw 30.

The shaft 29 is carried rotatably free within a bearing block 31 mounted upon the frame 16, the output shaft 29 having a pulley 32 mounted thereupon for purpose of receiving an endless belt (not shown) to deliver output power.

The frame 16 may comprise any platform 33 mounted upon a framework 34, and to which the bearing blocks may be secured by bolts 35.

In operative use, the pulley 13 is driven by a power source to cause the internal gear to rotate about a stationary axis. This movement causes gears 22 also to rotate about fixed axes of rotating shafts 24. Due to the relatively smaller pitch circle diameters of the gears 22 than the pitch circle diameter of internal gear 20, the shafts 24 will rotate faster than the shaft 14 that carries the internal gear. The second gears 26 will cause the relatively smaller diameter pinion 27 to rotate faster than the second gears, thus resulting in increased rotational speed of the pulley 32 at the output end. Thus, as is illustrated in FIGURE 1, the travel of a length of pulley belt for pulley 32 along a dimension a will be faster than the travel of a length of pulley belt for pulley 13 along a dimension A, even though the dimensions are equal in length. To express it in other terms, the belt of pulley 32 will travel farther along dimension a than the belt of pulley 13 along dimension A for any given length of time in the transmission operation.

It is to be noted that an important feature of the present invention is the relatively greater pitch circle diameter of the gears 22 than the pitch circle radius of the internal gear, which is readily evident by the overlapping of the gears 22.

It is to be understood that the input end could be reversed to form the output end for use in certain machines.

It is to be further understood that the construction as illustrated in the drawings herein may be made more compact, and that the drawings were made with the parts shown spread relatively far apart for purpose of providing clarity to the structure.

In a modified construction also covered by the present invention, the gears 22 may be made of dissimilar pitch circle diameters to drive correspondingly inverse dissimilar second gears.

While various changes may be made in the detail construction, it is understood that such changes will be within the spirit and scope of the present invention, as is defined by the appended claims.

Having thus set forth and disclosed the nature of this invention, what is claimed is:

1. In a transmitting device for speed increasing power, the combination of a frame, a transmission mechanism supported on said frame, said transmission mechanism comprising a first gear train, an input mechanism to drive said first gear train, a simple second gear train driven by said first gear train, said simple second gear train being connected to an output mechanism to attain a speed change of said output mechanism relative to said input mechanism, said first gear train comprising an internal gear, a pair of gears within said internal gear and engaged therewith, said pair of gears being in side by side position to each other and overlapping each other, said internal gear being driven by said input mechanism, and said pair of gears comprising drive means for said simple second gear train.

2. The combination as set forth in claim 1 wherein said input mechanism comprises an input shaft, bearing blocks secured upon said frame for supporting said input shaft rotatably free, a pulley secured upon said shaft for receiving an endless belt driven from a power source, one end of said shaft being secured within a hub of a spider mounted upon one side of said internal gear.

3. The combination as set forth in claim 2 wherein said simple gear train comprises a pair of shafts mounted rotatably free in bearing blocks upon said frame, one of each of said gears being secured to one end of each of said pair of shafts, a second gear being affixed upon each of said pair of shafts, said second gears being engaged with a pinion, mounted upon an output shaft.

4. The combination as set forth in claim 3 wherein said output mechanism comprises said output shaft being mounted rotatably free in bearing blocks secured upon said frame, and a pulley being secured upon said output shaft to provide output means to an endless belt placed thereupon.

5. The combination as set forth in claim 4 wherein each said gear engaged with said internal gear has a pitch circle diameter which is greater than the pitch circle radius of said internal gear.

6. The combination as set forth in claim 5 wherein said gears engaged with said internal gear are of equal pitch circle diameters.

7. The combination as set forth in claim 4 wherein said gears engaged with said internal gear are of dissimilar pitch circle diameters, and said second gears mounted on the same shafts of said gears are inversely dissimilar.

8. The combination as set forth in claim 7 wherein said frame comprises a platform supported on a framework.

References Cited

UNITED STATES PATENTS

| 1,064,736 | 6/1913 | James | 74—421 |
| 2,868,037 | 1/1959 | Hindmarch | 74—803 X |
| 3,359,826 | 12/1967 | Hanslick | 74—421 X |

FOREIGN PATENTS 969,915  5/1950  France.

FRED C. MATTERN, Jr, *Primary Examiner.*
LEONARD H. GERIN, *Assistant Examiner.*